(No Model.)

C. H. M. WHARTON.
LACING CORD FASTENER.

No. 365,659.          Patented June 28, 1887.

Witnesses
Percy White
Robt. M. Bell

Inventor
Charles H. M. Wharton
By his Attorney
W. P. Bell

N. PETERS, Photo-Lithographer, Washington, D. C.

UNITED STATES PATENT OFFICE.

CHARLES H. M. WHARTON, OF MANCHESTER, COUNTY OF LANCASTER, ENGLAND.

LACING-CORD FASTENER.

SPECIFICATION forming part of Letters Patent No. 365,659, dated June 28, 1887.

Application filed March 16, 1887. Serial No. 231,139. (No model.) Patented in England May 8, 1886, No. 6,225.

*To all whom it may concern:*

Be it known that I, CHARLES H. M. WHARTON, a subject of the Queen of Great Britain, residing at Manchester, in the county of Lancaster, England, have invented certain new and useful Improvements in Lacing-Cord Fasteners; and I do hereby declare the following to be a full, clear, and exact description of the invention, such as will enable others skilled in the art to which it appertains to make and use the same.

My invention relates to fasteners for retaining the ends of the lacing-strings of boots, shoes, corsets, belts, and other articles, such as are formed of two parts, which are designed to be united securely together and require to be readily connected and disconnected by means of the lacing-string.

The object of my invention is to produce a fastener which shall be simple in construction and easy of application to the article upon which it is to be used, and which shall securely hold the end of the lacing-cord without the aid of strings or other similar attachments.

To the above purposes my invention consists in a lacing-cord fastener connected to the fabric or material in such manner as to operate with a hinge-like movement when receiving the cord, and so formed as to securely hold the cord against all pulling strains.

My invention further consists in certain peculiar and novel features of construction and arrangement, as hereinafter described and claimed.

In order that my invention may be fully understood, I will proceed to describe it with reference to the accompanying drawings, in which—

Figure 1:
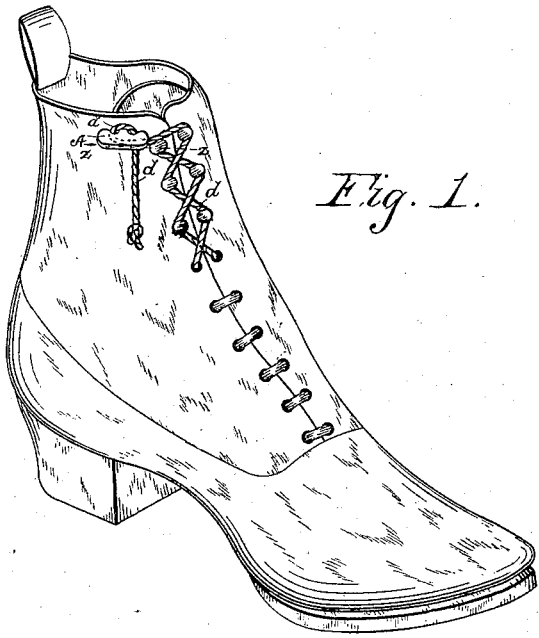
Figure 2:
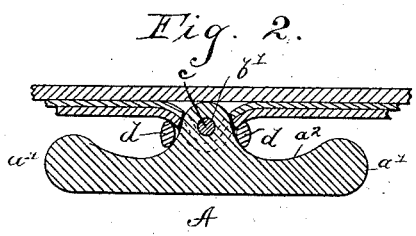
Figure 3:
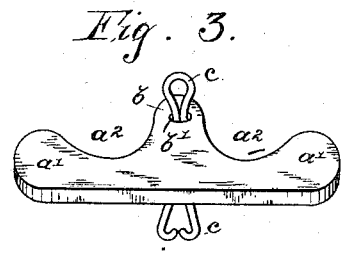
Figure 4:
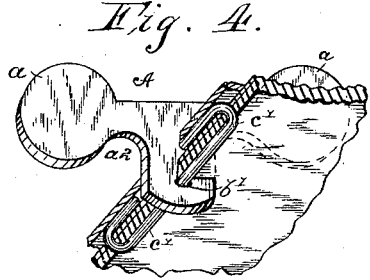
Figure 5:
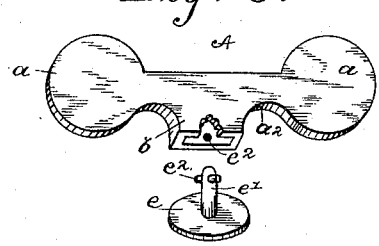

Figure 1 is a perspective view of a shoe with my improved lacing-cord fastener applied thereto. Fig. 2 is a sectional view of the same on the line $z\ z$ of Fig. 1. Fig. 3 is a detached perspective view of the same. Fig. 4 is a perspective view of the fastener provided with a modified form of holder. Fig. 5 is a detached view of the fastener with its parts separated from each other.

In the said drawings, A designates the body of the fastener consisting of a piece of metal of elongated form and having its ends enlarged either spherically, as shown at $a$ in Figs. 4 and 5, or semi-spherically, as shown at $a'$ in Figs. 2 and 3, so as to produce recesses $a^2$ on the under side of the body. Midway of its length the bar A is formed on its under side with an integral stud or shank, $b$, which is designed to enter an opening made in the material of a shoe, as shown in Fig. 1, or of a corset or other similar article, as shown in Figs. 2, 3, and 4. This shank is perforated at $b'$ to receive a key or cotter, $c$, which lies against the opposite side of the fabric to that occupied by the bar or body A. By virtue of this arrangement the bar, while being securely attached to the fabric and lying closely against the outer surface of the same, is capable of tilting or rocking upon the key or cotter $c$, as on a hinge, so that the two extremities of the body may be alternately pressed upon and raised off of the material. The purpose of this action is to admit the cord $d$ easily beneath the bar and to cause said bar to press firmly upon both strands or bends thereof, so as to securely hold the cord within the recesses $a^2$. This tilting or hinge-like movement also occurs when the cord is being released from the fastener, and facilitates the rapid removal of the strands.

In Fig. 4 the cotter $c'$ is slightly modified in form, as compared with that before described, so as to secure the bar to two layers of material, as the leather and lining of a shoe, without passing through the under layer. In Fig. 5 the cotter is dispensed with, and a shank or shoe, $e$, having a stem, $e'$, with projections $e^2$, is employed in lieu thereof. In this form the stud $b$ is formed hollow with lateral recesses $e^2$, and when the stem $e'$ is pressed up through the material it enters the hollow stud and becomes firmly secured to the body A. In all of the above forms, however, the principle of operation is the same—that is, the body or bar A is securely held to the material, but at the same time is capable of performing the tilting or hinge-like movements above referred to. Thus all spring plates or washers which have heretofore been required are rendered unnecessary, and the device is greatly simplified in construction and its range of application is greatly enlarged. It will be seen, also, that the cord will be securely held by the fastener with but one turn of the cord thereon, owing to the equal pressure at both ends of the body, so that the cord cannot be pulled out accidentally.

Having thus described my invention, what I claim as new, and desire to secure by Letters Patent, is—

1. An improved article of manufacture, consisting of the lacing-cord fastener with its outer centrally-pivoted body portion, A, and its base or hinged portion, all substantially as shown and described.

2. An improved lacing-cord fastener, consisting of an elongated bar or body recessed on its under side and provided with a lug or stud, b, and connected to the material by a hinge-piece, so as to tilt or rock thereon, substantially as set forth.

3. The combination, with the bar or body A, having recesses a on its under side, and a perforated lug or stud, b, of the key or cotter c, for connecting the body to the material, so as to allow said body portion to tilt or rock thereon, substantially as specified.

In testimony whereof I affix my signature in presence of two witnesses.

C. H. M. WHARTON.

Witnesses:
ARTHUR C. HALL,
ALBERT E. HALL,
9 Main St., Manchester.